US006966246B2

(12) United States Patent
Yeh

(10) Patent No.: US 6,966,246 B2
(45) Date of Patent: Nov. 22, 2005

(54) HORIZONTAL BAND SAW

(76) Inventor: Roger Yeh, 7625 E. Rosecrans Ave., #24, Paramount, CA (US) 90723

( * ) Notice: Subject to any disclaimer, the term of this patent is extended or adjusted under 35 U.S.C. 154(b) by 63 days.

(21) Appl. No.: 10/748,201

(22) Filed: Dec. 31, 2003

(65) Prior Publication Data

US 2005/0139053 A1    Jun. 30, 2005

(51) Int. Cl.[7] ............ B26D 5/20; B26D 3/10; B23D 53/00
(52) U.S. Cl. ............ 83/76.7; 83/871; 83/581; 83/432; 83/811; 83/813; 83/789
(58) Field of Search ............ 83/581, 76.7, 788–789, 83/809–813, 800–801, 425, 794, 796, 799, 83/432, 435.2, 707, 871; 144/4.9, 43, 130, 144/185, 187, 193.2, 378, 357, 391

(56) References Cited

U.S. PATENT DOCUMENTS

| | | | | |
|---|---|---|---|---|
| 166,355 A | * | 8/1875 | First ............ | 83/436.15 |
| 547,433 A | * | 10/1895 | Hazewinkel ............ | 83/422 |
| 999,475 A | * | 8/1911 | Wilkin ............ | 83/811 |
| 1,482,711 A | * | 2/1924 | Sorenson ............ | 83/871 |
| 3,739,679 A | * | 6/1973 | Schwend ............ | 83/789 |
| 3,789,717 A | * | 2/1974 | Stolzer ............ | 83/796 |
| 4,111,085 A | * | 9/1978 | Johnson ............ | 83/871 |
| 4,603,610 A | * | 8/1986 | Whitehouse ............ | 83/13 |
| 5,666,872 A | * | 9/1997 | McDonald et al. ............ | 83/871 |
| 6,766,725 B2 | * | 7/2004 | Yeh ............ | 83/871 |
| 6,772,665 B1 | * | 8/2004 | Hurdle, Jr. ............ | 83/109 |

* cited by examiner

*Primary Examiner*—Boyer D. Ashley
(74) *Attorney, Agent, or Firm*—Fei-Fei Chao; Bingham McCutchen LLP

(57) ABSTRACT

A horizontal band saw includes a base assembly, a sawing mechanism and a bevel cutting adjustment device. The base assembly includes a frame and a conveyer. The frame has a transverse passage. The conveyer is mounted in the transverse passage of the frame. The sawing mechanism is pivotally mounted on the frame and includes a housing. The housing is pivotally mounted on the frame and has a bottom and a cutting window above the conveyer. The bevel cutting adjustment device is mounted on the frame, connects to the bottom of the housing and is used to pivot the sawing mechanism relative to the conveyer so that the horizontal band saw can make a bevel cut in a workpiece.

10 Claims, 4 Drawing Sheets

HORIZONTAL BAND SAW

BACKGROUND OF THE INVENTION

1. Field of the Invention

The present invention relates to a horizontal band saw, and more particularly to a horizontal band saw that can make bevel cuts in a workpiece.

2. Description of Related Art

Band saws are often used to saw a huge workpiece into small pieces, such as to saw logs into lumber. One type of band saw is a horizontal type. The horizontal type band saw has an endless bandsaw blade. The endless bandsaw blade is a metal belt and is operated horizontally.

With reference to FIG. 4, a horizontal band saw in accordance with the prior art comprises a sawing mechanism (80), a frame (90), an elevating device (not numbered) and a horizontal conveyer (92). The sawing mechanism (80) is mounted on the frame (90) and comprises a housing (81), two wheels (82), a bandsaw blade (83), a cover (85) and a power assembly (not shown). The housing (81) has a top (not numbered), a bottom (not numbered), a front (not numbered), a rear (not shown), a cavity (not numbered) and a cutting window (84). The cavity is defined in the front of the housing (81). The cutting window (84) has two sides (not numbered) and is defined in the bottom of the housing (81) from the front to the rear to permit a workpiece (not shown) moving on the conveyer (92) to pass through the housing (81) and be cut. The wheels (82) are rotatably mounted in the cavity of the housing (81) respectively at the sides of the cutting window (84). The bandsaw blade (83) is an endless band with multiple cutting teeth (not shown) and is mounted around and driven by the wheels (82). A segment of the bandsaw blade (83) is located horizontally across the cutting window (84) to cut a workpiece.

The power assembly is mounted on the rear of the housing (81) to drive at least one of the wheels (82).

The cover (85) is attached to the top of the housing (81) to selectively cover the cavity in the housing (81).

The sawing mechanism (80) is mounted on the frame (90) with the elevating device. The frame (90) has a top (not numbered), a front (not numbered) and a rear (not numbered). The elevating device comprises two hydraulic cylinders (91) that are mounted respectively in the frame (90) at the front and the rear of the frame (10). Each of the cylinders (91) is mounted vertically and has a rod (not shown). The rod can either retract into or extend out of the cylinder (91) and has an outside end (not shown). The outside ends respectively connect to the bottom of the housing (81) to lift or lower the whole sawing mechanism (80) in the vertical direction.

The conveyer (92) is mounted on the top of the frame (90) below the cutting window (84). Therefore, the workpiece can be placed and clamped on the conveyer (92) and moved horizontally by the conveyer (92) through the cutting window (84) where the running bandsaw blade (83) cuts the workpiece horizontally.

Since the whole sawing mechanism (80) only can be lifted up or lowered in the vertical direction by the cylinders (91) of the elevating device, a bevel cut in the workpiece is impossible without any other aids. The vertical movement of the sawing mechanism (80) only allows the thicknesses of the horizontal cut to be varied. The usage and application of the conventional band saw is limited.

To overcome the shortcomings, the present invention provides a horizontal band saw with a capability to make a bevel cut in a workpiece to mitigate or obviate the aforementioned problems.

SUMMARY OF THE INVENTION

The main objective of the invention is to provide a horizontal band saw that comprises a sawing mechanism can make a horizontal cut in a workpiece or be adjusted to a given angular position to make a bevel cut in a workpiece.

The horizontal band saw includes a base assembly, a sawing mechanism and a bevel cutting adjustment device. The base assembly includes a frame and a conveyer. The frame has a transverse passage. The conveyer is mounted in the transverse passage of the frame. The sawing mechanism is pivotally mounted on the frame and includes a housing. The housing is pivotally mounted on the frame and has a bottom and a cutting window above the conveyer. The bevel cutting adjustment device is mounted on the frame, connects to the bottom of the housing and is used to pivot the sawing mechanism to a given angular position relative to the conveyer so that the horizontal band saw can make a bevel cut in a workpiece.

Other objectives, advantages and novel features of the invention will become more apparent from the following detailed description when taken in conjunction with the accompanying drawings.

DETAILED DESCRIPTION OF PREFERRED EMBODIMENT

Figure 1:
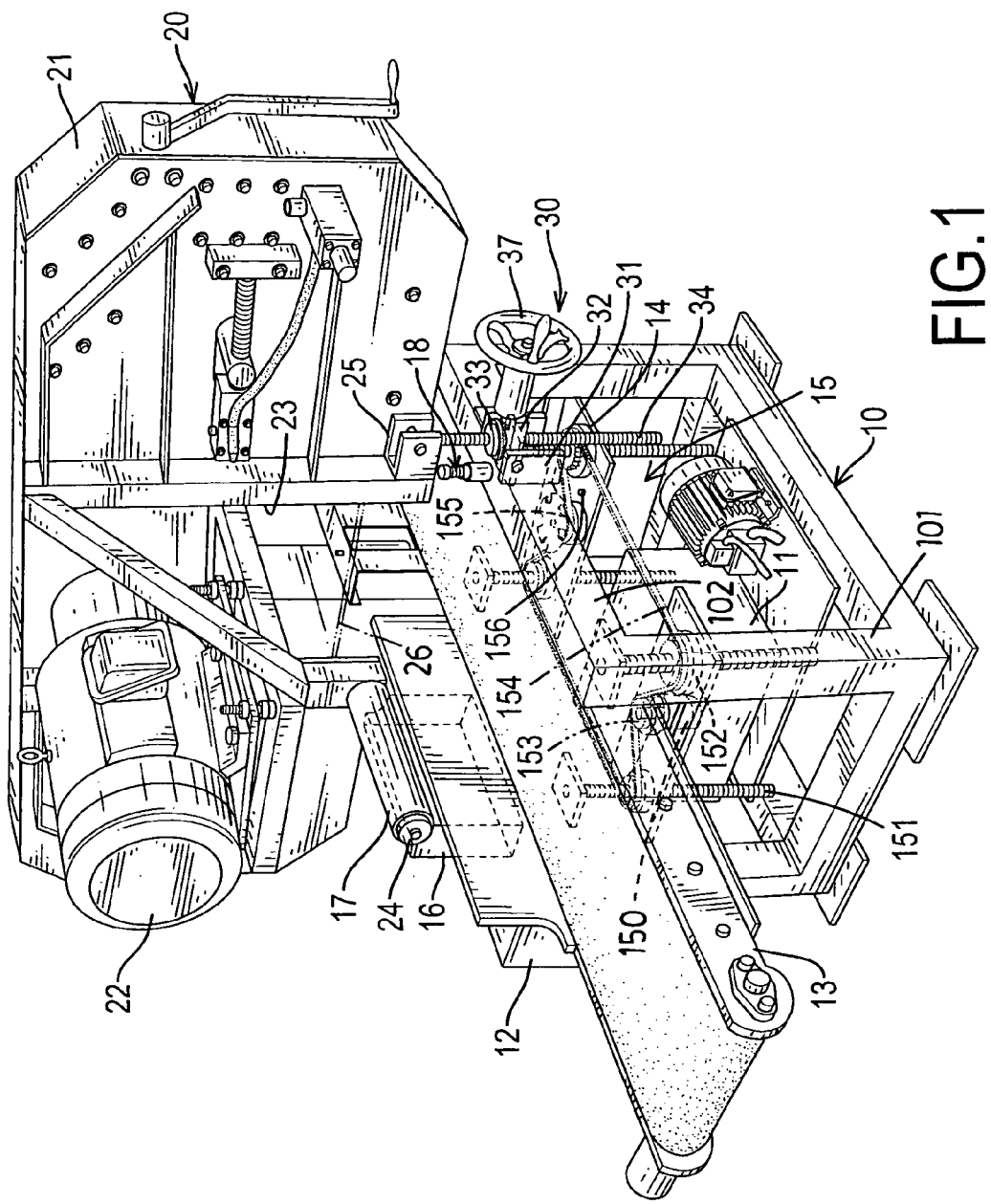
FIG. 1 is a perspective view of a horizontal band saw in accordance with the present invention.
Figure 3:
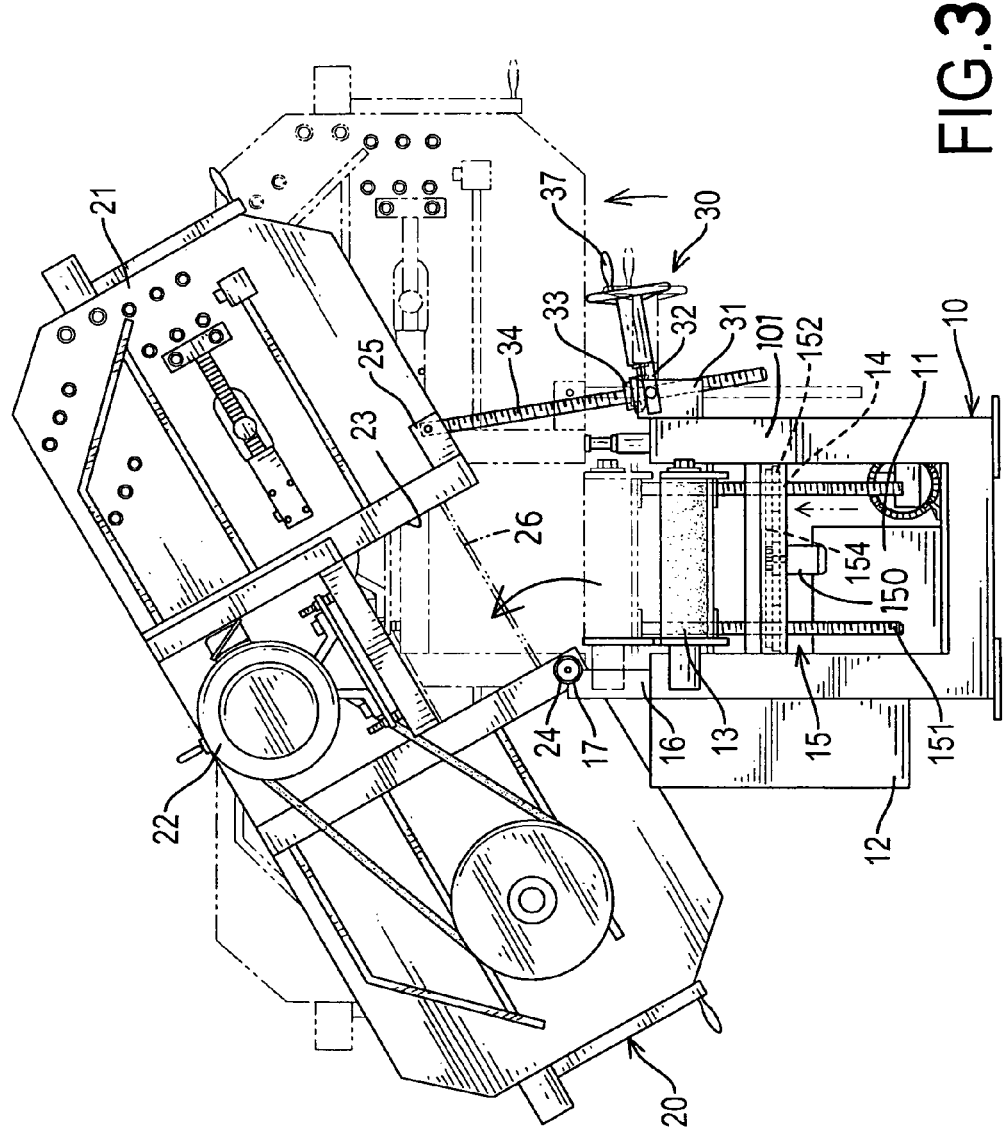
FIG. 3 is an operational side plan view of the horizontal band saw in FIG. 1 when a sawing mechanism is pivoted relative to a base assembly to make a bevel cut in a workpiece.
Figure 4:
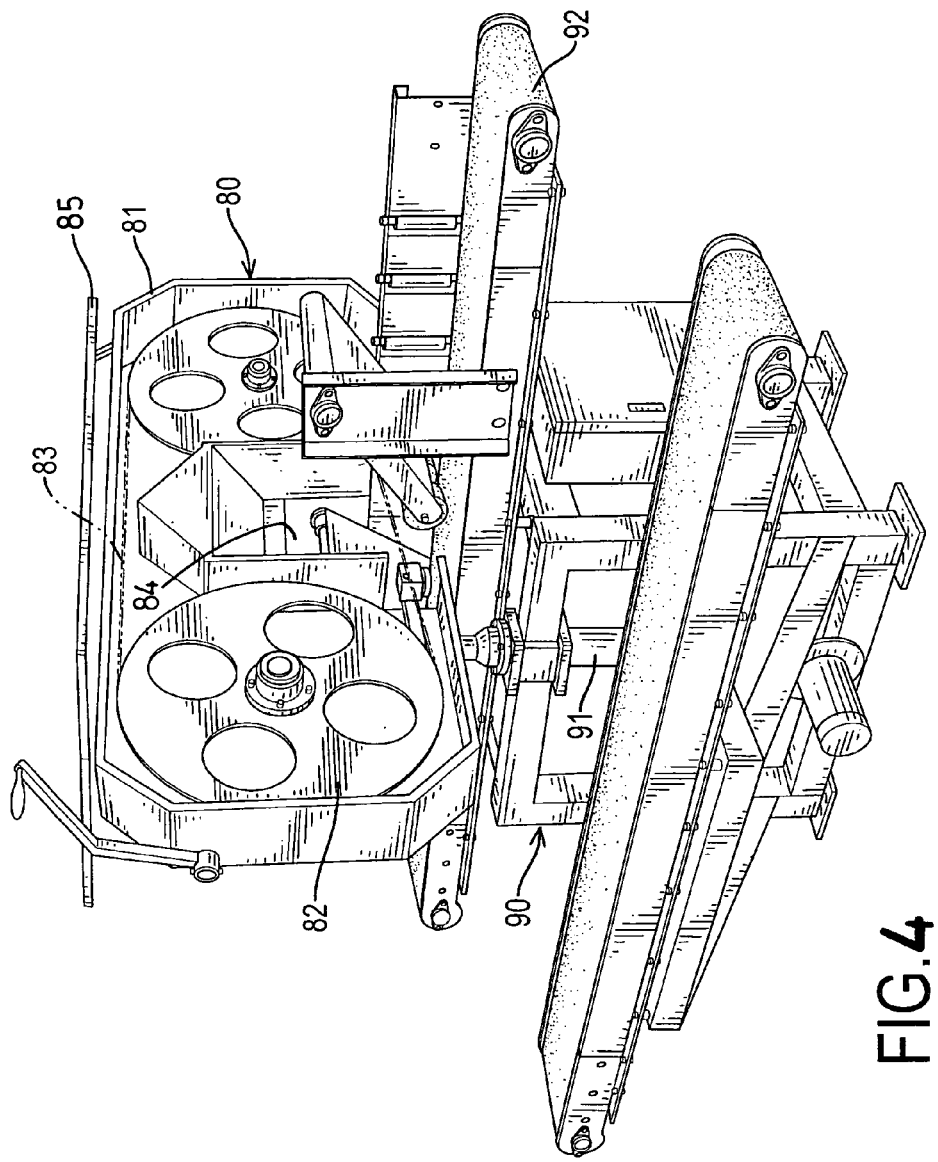
FIG. 4 is a perspective view of a conventional horizontal band saw in accordance with the prior art.

With reference to FIGS. 1 and 3, a horizontal band saw (not numbered) in accordance with the present invention comprises a base assembly (not numbered), a sawing mechanism (20) and a bevel cutting adjustment device (30). The sawing mechanism (20) is conventional and is pivotally mounted on the base assembly by the bevel cutting adjustment device (30).

The bevel cutting adjustment device (30) pivotally adjusts the sawing mechanism (20) to an angular position relative to the base assembly so that the band saw can make a bevel cut in a workpiece.

The base assembly comprises a frame (10), an actuator (11), a control box (12), a conveyer (13) and an elevating device (15).

The frame (10) has a transverse passage (not numbered), a front (not numbered) and a rear (not numbered) and may be formed with a base (not numbered), four vertical supports (101) and two transverse beams (102). The base has four corners (not numbered). The vertical supports (101) are integrally formed on the base and are formed respectively at the corners. Each of the vertical supports (101) has a top end (not shown). The transverse beams (102) are attached respectively to the top ends of two adjacent vertical supports (101), are parallel to each other and respectively have a top (not numbered). The transverse passage is formed between the transverse beams (102) and the vertical supports (101). The transverse beams (102) are mounted respectively at the front and the rear of the frame (10).

The actuator (11) is mounted on the base of the frame (10) and may be a hydraulic actuating apparatus, such as an oil pump to actuate the elevating device (15).

The control box (12) is mounted on the rear of the frame (10) to control and actuate the actuator (11).

The conveyer (13) is mounted in the transverse passage of the frame (10) and is supported by the elevating device (15). The conveyer (13) moves a workpiece (not shown) so the sawing mechanism (20) cuts the workpiece.

The elevating device (15) is mounted in the frame (10) and comprises two mounting brackets (14), a hydraulic motor (150), four threaded lifting rods (151), four rod drive wheels (152), two belt drive wheels (153), a lifting belt (154), a counting disk (155) and a sensor (156).

The mounting brackets (14) are fastened respectively to the vertical supports (101) of the frame (10) and are parallel to each other. Each of the mounting brackets (14) has a top (not numbered) and a bottom (not numbered).

The hydraulic motor (150) is mounted on the bottom of one of the mounting brackets (14), is controlled by the actuator (11) and has a shaft (not numbered) extending up through the mounting bracket (14). The rod drive wheels (152) are mounted rotatably on the mounting brackets (14) adjacent respectively to the vertical supports (101) and respectively have an axial threaded hole (not numbered). The threaded lifting rods (151) are rotatably mounted respectively in the axial threaded holes in the rod drive wheels (152) and respectively have a top end (not numbered). Therefore, the threaded lifting rods (151) can either extend out of or retracted into the axial threaded holes as the rod drive wheels (152) are turned in either counterclockwise or clockwise directions.

The conveyer (13) is mounted on the top ends of the threaded lifting rods (151) and is lifted up or lowered by the threaded lifting rods (151) as the rod drive wheels (152) are turned.

The belt drive wheels (153) are rotatably mounted on the tops of the mounting brackets (14) between the rod drive wheels (152). One of the belt drive wheels (153) is mounted on the shaft of the hydraulic motor (150) and is turned by the shaft. The counting disk (155) is attached concentrically on the other one of the belt drive wheels (153) and has an outer edge (not numbered) and multiple counting recesses (not numbered). The counting recesses are equidistantly defined at the outer edge of the counting disk (155).

The lifting belt (154) is an endless chain and meshes with the rod drive wheels (152) and the chain drive wheels (153). The sensor (156) is mounted on the top of one of the mounting brackets (14), electrically connects to the control box (12) and selectively corresponds to the counting recesses of the counting disk (155). The hydraulic-motor (150) rotates the connected chain drive wheel (153) that rotates simultaneously the rod drive wheels (152) and the other chain drive wheel (153) by means of the lifting belt (154). Therefore, a height of the conveyer (13) relative to the base of the frame (10) will be changed depends on the direction of revolutions of the shaft of the hydraulic motor (150). Meanwhile, the counting disk (155) is turned by the chain drive wheel (153). The revolutions of the rod drive wheels (152) can be calculated by the sensor (156) sensing the counting recesses of the counting disk (155) passing over the sensor (156) to adjust the conveyer (13) to a given height. The principles of operating the counting disk (155) and the sensor (156) are just like an encoder used in a servo control system.

The sawing mechanism (20) is conventional and comprises a housing (21), a motor (22) and a bandsaw blade (26). The housing (21) has a bottom (not numbered) and a cutting window (23) defined in the bottom. The bottom of the housing (21) is mounted on the tops of the transverse beams (102) with the bevel cutting adjustment device (30). The bandsaw blade (26) is an endless band and is mounted in the housing (21) and traverses the cutting window (23). Since the sawing mechanism (20) is convention, no further detailed description is provided.

The bevel cutting adjustment device (30) is mounted on the transverse beams (102) and comprises a rear pivot assembly (not numbered) and a front adjustment assembly (not numbered). The rear pivot assembly and the front adjustment assembly connect to the bottom of the housing (21) and are attached respectively to the transverse beams (102) of the frame (10). The rear pivot assembly comprises a mounting block (16), a stationary cylinder (17) and a pivot shaft (24). The mounting bracket (16) is fastened to the top of the transverse beam (102) at the rear of the frame (10) and has a top (not numbered). The stationary cylinder (17) is fastened transversely on the top of the mounting block (16). The pivot shaft (24) is rotatably mounted in the stationary cylinder (17) and connects to the bottom of the housing (21).

Figure 2:
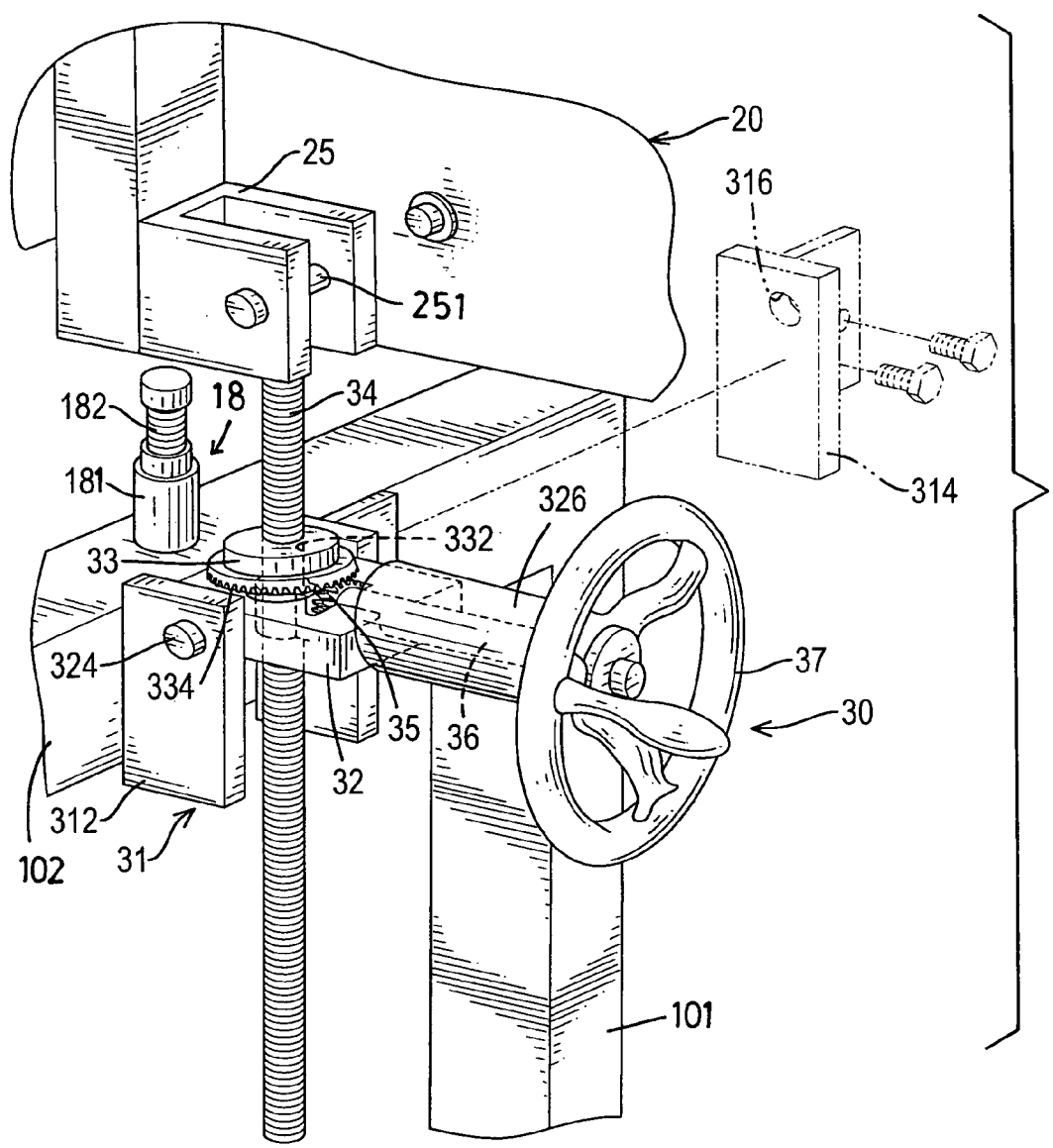
FIG. 2 is a perspective view of a front adjustment assembly of the horizontal band saw in FIG. 1.

With further reference to FIG. 2, the front adjustment assembly comprises a vertical supporting post (18) and an inclination adjusting assembly (not numbered). The supporting post (18) is mounted on the top of the transverse beam (102) at the front of the frame (10) at a position below the bottom of the housing (21) and comprises a stationary seat (181) and a threaded shank (182). The stationary seat (181) is attached to the top of the transverse beam (102). The threaded shank (182) retractably screws into the stationary seat (181) and has an enlarged top end (not numbered). The enlarged top end of the threaded shank (182) supports the bottom of the housing (21) when the sawing mechanism (20) is not pivoted relative to the conveyer (13).

The inclination adjusting assembly is mounted on the transverse beam (102) at the front of the frame (10) and comprises a top stationary bracket (25), a bottom stationary bracket (31), a pivot seat (32), an adjusting gear (33), a leader threaded rod (34) and a driving assembly (not numbered).

The top stationary bracket (25) is attached to the bottom of the housing (21) and has a pivot pin (251). The bottom stationary bracket (31) is attached to the transverse beam (102) at the front of the frame (10) and comprises a stationary block (312) and a detachable block (314). The stationary block (312) is attached to the transverse beam (102) at the front of the frame (10). The detachable block (314) is attached detachably to the transverse beam (102) and is aligned with the stationary block (312). The stationary and the detachable blocks (312, 314) respectively have an aligned pin hole (316). The pivot seat (32) is mounted pivotally on the stationary bracket (31) between the blocks (312, 314) and has a top (not numbered) and two pivot pins (324). The pivot pins (324) are held respectively in the pin holes (316) of the two blocks (312, 314).

The adjusting gear (33) is mounted rotatably on the top of the pivot seat (32), is driven by the driving assembly and has an axial threaded hole (332) and a ring gear (334). The driving assembly is mounted on the pivot seat (32) to rotate the adjusting gear (33) and comprises a driving pinion (35), a drive shaft (36), a shaft sleeve (326) and a handwheel (37). The shaft sleeve (326) is attached to the pivot seat (32). The driving shaft (36) is rotatably mounted in the shaft sleeve (326) and has an inside end (not numbered) and an outside end (not numbered). The inside end and the outside end extend out of the shaft sleeve (326). The handwheel (37) is attached to the outside end of the driving shaft (36) to turn the driving shaft (36). The driving pinion (35) is attached to the inside end of the driving shaft (36) and is rotated by the driving shaft (36) as the handwheel (37) is turned. The ring gear (334) of the adjusting gear (33) meshes with the driving pinion (35) so that the driving pinion (35) rotates the adjusting gear (33).

The leader threaded rod (34) screws into the axial threaded hole (332) in the adjusting gear (33) and has a top end (not numbered) and a bottom end (not numbered). The top end connects to the pivot pin (251) in the top stationary bracket (25). The bottom end extends out of the pivot seat (32). The top end of the leader threaded rod (34) can either extend out of or retract into the axial threaded hole (332) to change the distance of the top stationary bracket (25) from the top of the transverse beam (102) as the adjusting gear (33) is turned in either clockwise or counterclockwise directions.

With reference to FIG. 3, the band saw is adjusted to make a bevel cut in a workpiece (not shown) that is moved by the conveyer (13) by turning the handwheel (37) to rotate the adjusting gear (33) and retract or extend the leader threaded rod (34) relative to the pivot seat (32). When the leader threaded rod (34) retracts or extends, the housing (21) of the sawing mechanism (20) simultaneously pivots about the pivot shaft (24). The bandsaw blade (26) is not horizontal as the whole sawing mechanism (20) is pivoted about the pivot shaft (24). Therefore, the bandsaw blade (26) can make a bevel cut in the workpiece that is moved by the conveyer (13).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A horizontal band saw comprising:
   a base assembly comprising
      a frame having a front, a rear and a transverse passage formed between the front and the rear;
      an elevating device mounted in the frame; and
      a conveyer mounted in the transverse passage of the frame and supported by the elevating device;
   a sawing mechanism pivotally mounted on the frame and comprising
      a housing pivotally mounted on the frame and having a bottom and a cutting window above the conveyer; and
      a bandsaw blade mounted in the housing and having a segment traversing the cutting window; and
   a bevel cutting adjustment device connecting the frame to the housing and the bevel cutting adjustment device comprising
      a rear pivot assembly mounted on the rear of the frame and pivotally connected to the bottom of the housing; and
      a front adjustment assembly mounted on the front of the frame and connected to the bottom of the housing, and the front adjustment assembly comprising
      an inclination adjusting assembly connecting the front of the frame to the bottom of the housing and the inclination adjusting assembly comprising
         a top stationary bracket mounted on the bottom of the housing and having a pivot pin;
         a bottom stationary bracket mounted on the front of the frame and aligned with the top stationary bracket;
         a pivot seat pivotally mounted on the bottom stationary bracket and having a top;
         an adjusting gear rotatably mounted in the top of the pivot seat and having an axial threaded hole;
         a driving assembly mounted on the pivot seat to turn the adjusting gear; and
         a leader threaded rod screwed into the axial threaded hole of the adjusting gear and having a top end pivotally connected to the pivot pin of the top stationary bracket and a bottom end extending out of the pivot seat;
   wherein the leader threaded rod selectively extends out of and retracts into the axial threaded hole of the adjusting gear to move the top stationary bracket closer to or farther away from the conveyer as the adjusting gear is turned.

2. The horizontal band saw as claimed in claim 1, wherein the driving assembly of the inclination adjusting assembly comprises
   a shaft sleeve fastened on the pivot seat;
   a diving shaft rotatably mounted in the shaft sleeve and having an inside end and an outside end that extend respectively out of the shaft sleeve;
   a handwheel attached to the outside end of the driving shaft to turn the driving shaft; and
   a driving pinion attached to the inside end of the driving shaft and rotated by the driving shaft; and
   the adjusting gear further has a ring gear engaged by the driving pinion.

3. The horizontal band saw as claimed in claim 1, wherein the bottom stationary bracket comprises a stationary block fastened on the front of the frame and a detachable block detachably attached to the front of the frame, and the stationary block and the detachable block respectively have an aligned pin hole; and
   the pivot seat is pivotally mounted between the stationary and the detachable blocks and further has two pivot pins respectively held in the pin holes of the stationary and the detachable blocks.

4. The horizontal band saw as claimed in claim 1, wherein the front adjustment assembly further comprises a vertical supporting post mounted on the frame at a position below the bottom of the housing, the vertical supporting post comprises a stationary seat attached to the frame at the position and a threaded shank retractably screws into the stationary seat and having an enlarged top end to support the bottom of the housing.

5. The horizontal band saw as claimed in claim 1, wherein the frame further comprises a base having has four corners, a vertical support with a top end integrally formed at each of the corners of the base and a transverse beam with a top mounted on the top ends of two of the vertical supports;
   wherein the transverse beams are parallel to each other, and the transverse passage is defined between the transverse beams.

6. The horizontal band saw as claimed in claim 2, wherein the bottom stationary bracket comprises a stationary block fastened on the front of the frame and a detachable block detachably attached to the front of the frame, and the stationary block and the detachable block respectively have an aligned pin hole; and the pivot seat is pivotally mounted between the stationary and the detachable blocks and further has two pivot pins respectively held in the pin holes of the stationary and the detachable blocks.

7. The horizontal band saw as claimed in claim 6, wherein the front adjustment assembly further comprises a vertical supporting post mounted on the frame at a position below the bottom of the housing, the vertical supporting post comprises a stationary seat fastened on the frame at the position and a threaded shank retractably screws in the stationary seat and having an enlarged top end to support the bottom of the housing.

8. The horizontal band saw as claimed in claim 7, wherein the frame further comprises a base having has four corners, a vertical support with a top end integrally formed at each of the corners of the base and a transverse beam with a top mounted on the top ends of two of the vertical supports;

wherein the transverse beams are parallel to each other, and the transverse passage is defined between the transverse beams.

9. The horizontal band saw as claimed in claim 8, wherein the base assembly further comprises an actuator mounted on the base of the frame; and
a control box mounted on the rear of the frame; and
the elevating device comprises two mounting brackets respectively fastened on the vertical supports of the frame, and each of the mounting brackets having a top and a bottom;

a hydraulic motor mounted on the bottom of one of the mounting brackets, actuated by the actuator and having a shaft extended upward;

two rod drive wheels rotatably mounted on each of the mounting brackets and each of the rod drive wheels having an axial threaded hole;

a belt drive wheel mounted on the top of each of the mounting bracket between the rod drive wheels;

an endless lifting belt meshed with the rod drive wheels and the belt drive wheels; and a threaded lifting rod rotatably mounted in a respective one of the axial threaded holes in the rod drive wheels and having a top end connected to the conveyer;

wherein the shaft of the hydraulic motor concentrically connects to a respective one of the belt drive wheels to rotate the connected belt drive wheel.

10. The horizontal band saw as claimed in claim 9, wherein the elevating device further comprises a counting disk concentrically attached to a respective one of the belt drive wheels and having an outer edge and multiple counting recesses equidistantly defined at the outer edge of the counting disk; and a sensor mounted on the top of one of the mounting brackets, electrically connected to the control box and selectively corresponding to the counting recesses of the counting disk.

* * * * *